United States Patent
Kunihiro et al.

(10) Patent No.: US 10,649,454 B2
(45) Date of Patent: May 12, 2020

(54) AUTONOMOUS VEHICLE

(71) Applicant: TOYOTA JIDOSHA KABUSHIKI KAISHA, Toyota-shi, Aichi-ken (JP)

(72) Inventors: Yoji Kunihiro, Susono (JP); Yoshio Kudo, Machida (JP); Takahiro Kojo, Gotenba (JP); Masateru Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 15/843,986

(22) Filed: Dec. 15, 2017

(65) Prior Publication Data

US 2018/0181132 A1 Jun. 28, 2018

(30) Foreign Application Priority Data

Dec. 26, 2016 (JP) ................. 2016-251555

(51) Int. Cl.
G05D 1/02 (2020.01)
B62D 6/10 (2006.01)
G05D 1/00 (2006.01)
B62D 15/02 (2006.01)

(52) U.S. Cl.
CPC ............. *G05D 1/0212* (2013.01); *B62D 6/10* (2013.01); *B62D 15/0255* (2013.01); *G05D 1/0088* (2013.01)

(58) Field of Classification Search
CPC ...... G05D 1/0212; G05D 1/0088; B62D 6/00; B62D 6/10; B62D 15/0255

USPC .......................................................... 701/23
See application file for complete search history.

(56) References Cited

U.S. PATENT DOCUMENTS

| 9,623,851 | B1* | 4/2017 | Cymbal ................ B60T 8/1766 |
| 2004/0153228 | A1* | 8/2004 | Matsumoto ......... B60T 8/17552 |
| | | | 701/41 |
| 2015/0259006 | A1* | 9/2015 | Inoue .................... B62D 6/007 |
| | | | 701/41 |
| 2016/0091896 | A1 | 3/2016 | Maruyama |
| 2016/0225261 | A1* | 8/2016 | Matsumoto ............ G08G 1/167 |
| 2017/0029025 | A1* | 2/2017 | Kim ........................ B62D 6/10 |

FOREIGN PATENT DOCUMENTS

| JP | 2013-129328 A | 7/2013 |
| JP | 2015-205558 A | 11/2015 |
| JP | 2016-071513 A | 5/2016 |

* cited by examiner

*Primary Examiner* — Krishnan Ramesh
(74) *Attorney, Agent, or Firm* — Oliff PLC

(57) ABSTRACT

An autonomous vehicle having a control unit that is configured to perform autonomous driving in which a steered angle of steered wheels is changed by a steering device so that a steering angle becomes a target steering angle for making the vehicle travel along a target trajectory, and to control the steering device so that a lane change is performed in a standard manner when the lane change is necessary. In a situation where the lane change is necessary and a steering operation is being performed by a driver, when a magnitude of an index value based on a parameter that changes according to the steering operation is smaller than a termination reference value, the control device does not terminate the autonomous driving and changes a target trajectory of the lane change according to the magnitude of the index value.

9 Claims, 12 Drawing Sheets

AUTONOMOUS VEHICLE

CROSS-REFERENCE TO RELATED APPLICATION

The disclosure of Japanese Patent Application NO. JP2016-251555 filed on Dec. 26, 2016 is incorporated by reference in its entirety.

BACKGROUND

1. Technical Field

The present disclosure relates to an autonomous vehicle configured to travel along a travel path by means of steered wheels being autonomously steered.

2. Description of the Related Art

An autonomous vehicle is well known that has a steering device configured to steer steered wheels and a control unit configured to perform an autonomous driving to change steered angle of the steered wheels by controlling the steering device so that the vehicle travels along a target trajectory. The control unit is configured to calculate a target change amount of the steered angle of the steered wheels necessary for causing the vehicle to travel along the target trajectory, and to control the steering device so that a change amount of the steered angle of the steered wheels conforms to the target change amount.

Since it is sometimes necessary to change a lane even while the vehicle is driven by autonomous driving, the control unit determines whether or not it is necessary to change the lane in order to make the vehicle travel along the target trajectory. Further, when the control unit determines that it is necessary to change the lane, it changes the lane with a preset target trajectory. For example, in Japanese Patent Application Laid-open Publication No. 2016-71513, an autonomous vehicle is described which has a control unit that is configured to suggest a lane change of a preset target trajectory when it is determined that it is necessary to change lanes, and to execute the lane change by the proposed target trajectory when a driver agrees with the proposal.

In the autonomous vehicle described in the above Laid-open Publication, in order for the driver to agree with the proposal for lane change by autonomous driving, the driver needs to perform a special operation such as switch operation other than driving operation. Such a special operation is troublesome for the driver. Further, by such a special operation, it is only possible to indicate an alternative intention to decide whether or not to agree with the suggestion for lane change by autonomous driving. For this reason, even if the driver wishes to change the lane earlier or later than the suggested lane change, he or she cannot indicate the intention and he or she cannot correct the target trajectory of the suggested lane change as desired.

Furthermore, when the driver intends to correct the trajectory of the lane change after accepting the suggested lane change, he or she must perform a special operation and conduct a corrective steering so that the lane change trajectory of the vehicle is corrected. This is not only troublesome for the driver, but also in the case where an amount of corrective steering is large, it is determined that the driver is about to make the vehicle travel so as to deviate from the target trajectory, so that the autonomous driving is terminated even if the driver desires to continue the autonomous driving.

SUMMARY

The present disclosure provides an autonomous vehicle configured, by determining a driver's intention for lane change on the basis of steering operation by the driver when a lane change is executed by an autonomous driving, to perform a lane change so as to reflect the driver's intention without the need for performing any special operation other than steering operation by the driver.

According to the present disclosure, an autonomous vehicle is provided which comprises a steering device configured to steer steered wheels and a control unit configured to perform autonomous driving by calculating a target steering angle for making the vehicle travel along a target trajectory and by changing a steered angle of the steered wheels by controlling the steering device so that a steering angle conforms to the target steering angle, the control unit being configured to perform lane change by setting a target trajectory of the lane change to a preset standard trajectory when it is necessary to change a lane by the autonomous driving.

The control unit is configured, in a situation where a lane change by the autonomous driving is necessary and steering operation is performed by a driver, to change, without terminating the autonomous driving, the target trajectory of the lane change in accordance with a magnitude of an index value that changes in accordance with a steering operation of the driver and is used to decide an intent by the driver regarding a trajectory of the lane change when a magnitude of the index value is larger than a standard reference value and is smaller than a first autonomous driving termination reference value.

According to the above configuration, in a situation where a lane change by the autonomous driving is necessary and steering operation is performed by a driver, when a magnitude of the index value is larger than a standard reference value and is smaller than a first autonomous driving termination reference value, the autonomous driving is not terminated and the target trajectory of the lane change is changed in accordance with a magnitude of an index value. Accordingly, the driver, when the lane change is executed by the autonomous driving, can change the target trajectory of the lane change according to the magnitude of the index value without terminating the autonomous driving by conducting steering operation within a range where a magnitude of the index value is larger than a standard reference value and is smaller than a first autonomous driving termination reference value.

Furthermore, according to the above configuration, the intention of the driver regarding the trajectory of the lane change is determined according to the magnitude of the index value that changes in accordance with a steering operation of the driver and is used to decide an intent by the driver regarding a trajectory of the lane change. Therefore, by performing the steering operation without the need for performing any special operation other than the steering operation, the driver can make the lane change by the trajectory reflecting the intention of the driver.

In one aspect of the present disclosure, the index value is at least one of a steering torque, a steering angle, a steering angular velocity, a difference between a steering angle and the target steering angle and a lateral deviation of the vehicle with respect to the target trajectory.

According to the above aspect, the driver's intention regarding the trajectory of the lane change can be determined based on at least one of a steering torque, a steering angle, a steering angular velocity, a difference between a steering angle and the target steering angle and a lateral deviation of the vehicle with respect to the target trajectory. Accordingly, when the magnitude of the index value is smaller than the first autonomous driving termination reference value, the target trajectory of the lane change can be changed based on at least one of the five index values without terminating the autonomous driving so that the driver's intention regarding the lane change is reflected.

In another aspect of the present disclosure, the control unit is configured to change the target trajectory of the lane change to any one of a trajectory of the lane change earlier than the standard trajectory, a trajectory of the lane change later than the standard trajectory and a lane change canceling trajectory.

According to the above aspect, the driver, by performing a steering operation, can change the target trajectory of the lane change to any one of a trajectory of the lane change earlier than the standard trajectory, a trajectory of the lane change later than the standard trajectory and a lane change canceling trajectory in accordance with the magnitude of the index value.

Further, in another aspect of the present disclosure, the control unit is configured, when a magnitude of the index value is equal to or larger than the first autonomous driving termination reference value, to terminate the autonomous driving, and the first autonomous driving termination reference value is larger than a second autonomous driving termination reference value that is set for a situation where a lane change by the autonomous driving is unnecessary and a steering operation is being performed by the driver.

According to the above aspect, when the magnitude of the index value is equal to or larger than the first autonomous driving termination reference value, the autonomous driving is terminated, and the first autonomous driving termination reference value is larger than a second autonomous driving termination reference value that is set for a situation where a lane change by the autonomous driving is unnecessary and a steering operation is being performed by the driver. Accordingly, it is possible to reduce the risk that the autonomous driving that the driver wishes to continue is terminated due to the driver's steering operation, for example, as compared to where the first autonomous driving termination reference value is equal to or smaller than the second autonomous driving termination reference value. Therefore, it is possible to make it easy to change the target trajectory of the lane change by the driver's steering operation while continuing the autonomous driving.

Further, in another aspect of the present disclosure, the control unit is configured to set the target trajectory of the lane change to the standard trajectory when the magnitude of the index value is equal to or smaller than the standard reference value.

According to the above aspect, when the magnitude of the index value is equal to or smaller than the standard reference value, the target trajectory of the lane change is set to the standard trajectory. Therefore, it is possible to avoid that the target trajectory of the lane change is unnecessarily changed to a trajectory other than the standard trajectory.

In another aspect of the present disclosure, the control unit is configured to change the target trajectory of the lane change to the trajectory of the lane change earlier than the standard trajectory when a steering direction of the steered wheels caused by steering operation by the driver is the same as a steering direction of the steered wheels caused by the autonomous driving in a situation where a magnitude of the index value is larger than the standard reference value and is smaller than the first autonomous driving termination reference value.

According to the above aspect, when a steering direction of the steered wheels caused by steering operation by the driver is the same as a steering direction of the steered wheels caused by the autonomous driving in a situation where a magnitude of the index value is larger than the standard reference value and is smaller than the first autonomous driving termination reference value, the target trajectory of the lane change is changed to the trajectory of earlier lane change. Accordingly, by performing a steering operation so that the steered wheels are steered in the same direction as the steering direction of the steered wheels by the autonomous driving, the driver can change the target trajectory of the lane change to the trajectory of earlier lane change without the need for performing any special operation other than the steering operation.

In another aspect of the present disclosure, the control unit is configured to change the target trajectory of the lane change to the trajectory of the lane change later than the standard trajectory when the magnitude of the index value is equal to or smaller than a lane change cancellation reference value that is larger than the standard reference value and is smaller than the first autonomous driving termination reference value in a situation where a steering direction of the steered wheels caused by steering operation by the driver is opposite to a steering direction of the steered wheels caused by the autonomous driving.

According to the above aspect, the target trajectory of the lane change is changed to the trajectory of the lane change later than the standard trajectory when the magnitude of the index value is equal to or smaller than a lane change cancellation reference value in a situation where a steering direction of the steered wheels caused by steering operation by the driver is opposite to a steering direction of the steered wheels caused by the autonomous driving. Accordingly, by performing a steering operation within a range where the magnitude of the index value is equal to or smaller than the lane change cancellation reference value so that the steered wheels are steered in a direction opposite to the steering direction of the steered wheels by the autonomous driving, the driver can change the target trajectory of the lane change to the trajectory of later lane change without the need for performing any special operation other than the steering operation.

Further, in another aspect of the present disclosure, the control unit is configured to change the target trajectory of the lane change to the lane change canceling trajectory when the magnitude of the index value is larger than a lane change cancellation reference value that is larger than the standard reference value and is smaller than the first autonomous driving termination reference value in a situation where a steering direction of the steered wheels caused by steering operation by the driver is opposite to a steering direction of the steered wheels caused by the autonomous driving.

According to the above aspect, the target trajectory of the lane change is changed to the lane change canceling trajectory when the magnitude of the index value is larger than a lane change cancellation reference value in a situation where a steering direction of the steered wheels caused by steering operation by the driver is opposite to a steering direction of the steered wheels caused by the autonomous driving. Accordingly, by performing a steering operation within a range where the magnitude of the index value is larger than the lane change cancellation reference value so that the steered wheels are steered in a direction opposite to the steering direction of the steered wheels by the autonomous driving, the driver can change the target trajectory of the lane change to the lane change canceling trajectory and cancel the lane change without the need for performing any special operation other than the steering operation.

Further, in another aspect of the present disclosure, the control unit is configured to calculate a target steering assist torque for assisting a steering operation by the driver and to calculate a target steering torque of the autonomous driving for changing a steered angle of the steered wheels by controlling the steering device so that the steered angle conforms to the target steered angle; the steering device is configured to steer the steered wheels based on a sum of the target steering assist torque and the target steering torque of the autonomous driving; and the control unit is configured, when changing the target trajectory of the lane change to one of the trajectory of the lane change earlier than the standard trajectory and the lane change canceling trajectory, to increase the target steering assist torque as compared to where the target trajectory of the lane change is not changed to the one of the trajectories.

According to the above aspect, a target steering assist torque for assisting a steering operation by the driver is calculated and to calculate a target steering torque of the autonomous driving for changing a steered angle of the steered wheels by controlling the steering device so that the steered angle conforms to the target steered angle is calculated. The steered wheels are steered based on a sum of the target steering assist torque and the target steering torque of the autonomous driving. The target steering assist torque is increased as compared to where the target trajectory of the lane change is not changed to the one of the trajectories. Therefore, since the target steering assist torque is increased when the target trajectory of the lane change is changed to one of the earlier lane change trajectory and the lane change canceling trajectory, the driver can easily perform a steering operation and can easily change the target trajectory of the lane change to the earlier lane change trajectory or the lane change canceling trajectory.

Other objects, other features and attendant advantages of the present disclosure will be readily understood from the description of the embodiments of the present disclosure described with reference to the following drawings.

DETAILED DESCRIPTION

Embodiment

An embodiment of the present disclosure will now be described in detail with reference to the accompanying drawings.

Automatically driven vehicle 10 according to the embodiment of the present disclosure includes an electric power steering (EPS) device 12, an EPS control unit 14 serving as a control unit for controlling the electric power steering device 12, and a travel control unit 16.

Figure 1:
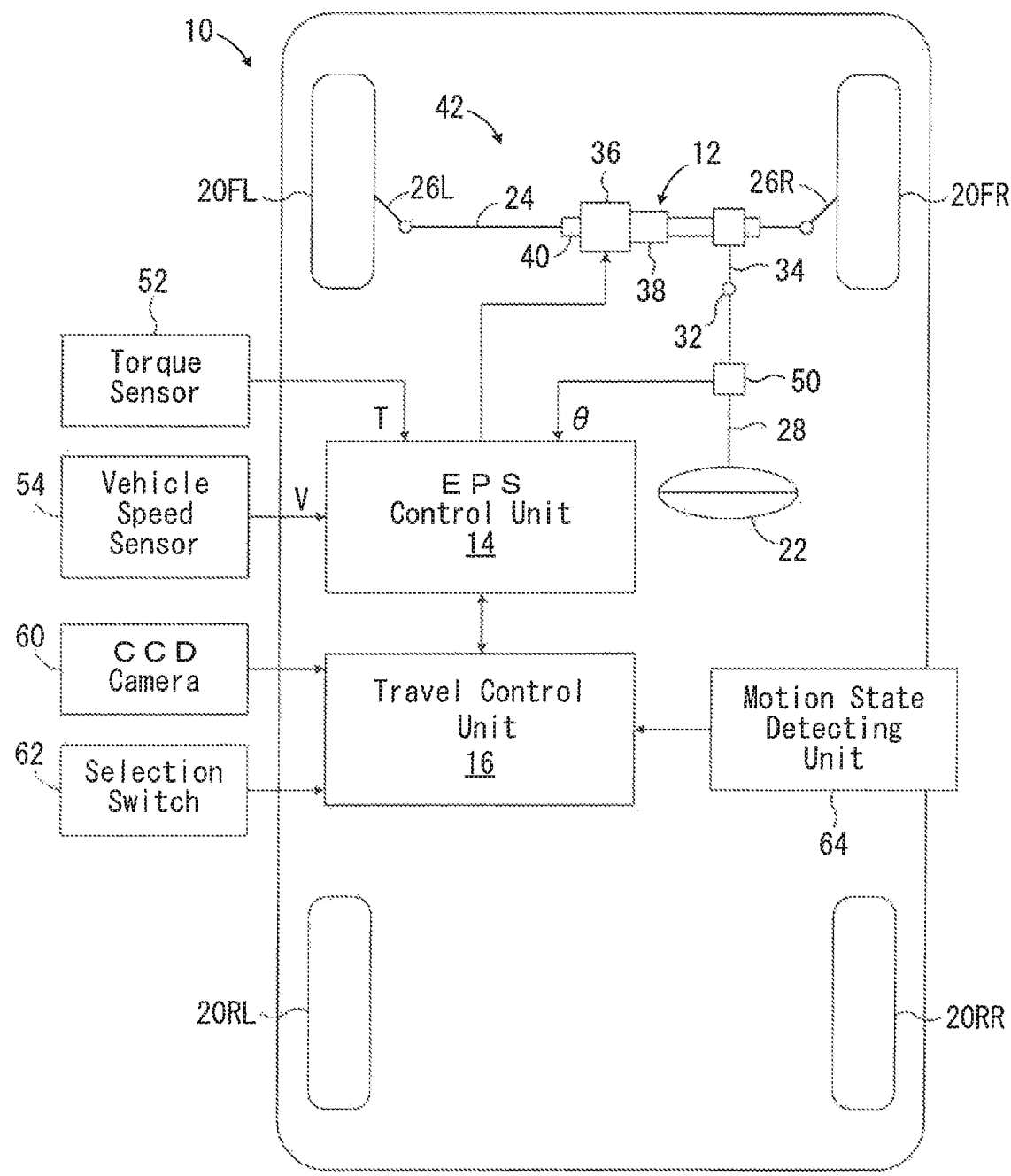
FIG. 1 is a schematic configuration diagram showing an autonomous vehicle according to an embodiment of the present disclosure.

As shown in FIG. 1, the vehicle 10 has left and right front wheels 20FL and 20FR as steerable wheels and right and left rear wheels 20RL and 20RR as non-steerable wheels. The front wheels 20FL and 20FR are steered through a rack bar 24 and tie rods 26L and 26R by the electric power steering device 12 driven in response to an operation of a steering wheel 22 by a driver. The steering wheel 22 is connected to a pinion shaft 34 of the electric power steering device 12 via a steering shaft 28 and a universal joint 32.

In the embodiment, the electric power steering device 12 is a rack coaxial type electric power steering device and includes an electric motor 36 and a screw type conversion mechanism 38 for converting a rotational torque of the electric motor 36 into a force in the reciprocating direction of the rack bar 24. The electric power steering device 12 generates a force to drive the rack bar 24 with respect to a housing 40, thereby reducing a steering burden of the driver and providing a driving torque for autonomously steering the front wheels 20FL and 20FR. The control of the electric power steering device 12 by the EPS control unit 14 will be described later in detail.

As can be understood from the above description, the steering shaft 28, the universal joint 32, the electric power steering device 12, the rack bar 24, the tie rods 26L and 26R, etc. form a steering device 42 for steering the front wheels 20FL and 20FR as necessary. The electric power steering device 12 is adapted to apply a driving force to the rack bar 24, but it may be adapted to apply torque to the steering shaft 28, for example.

In the first embodiment, the steering shaft 28 is provided with a steering angle sensor 50 for detecting a rotation angle of the steering shaft as a steering angle θ. A steering torque sensor 52 for detecting a steering torque T is provided on the pinion shaft 34. The steering torque sensor 52 may be provided on the steering shaft 28. A signal indicating a steering angle θ and a signal indicating a steering torque T are input to the EPS control unit 14. The vehicle 18 is provided with a vehicle speed sensor 54 for detecting a vehicle speed V. A signal indicating a vehicle speed V is also input to the EPS control unit 14. A steering angle θ and a steering torque T take positive values in the case of steering in the leftward turning direction of the vehicle. This also applies to computed values such as a target steering angle θlkat and a target driving assist steering torque Tds which will be described later.

Further, the vehicle 10 is provided with a CCD camera 60 for taking an image in front of the vehicle and a selection switch 62 is provided for selecting whether or not to perform a trajectory control (lane keeping assist control) for running the vehicle along a target trajectory (target travel path) which is referred to as "LKA control". The selection switch 62 is operated by an occupant of the vehicle and switched between an operation position (ON) where the LKA control is executed by the travel control unit 16 and a non-operating position (OFF) where the LKA control is not executed. A signal indicating image information in front of the vehicle taken by the CCD camera 60 and a signal indicating the position (ON or OFF) of the selection switch 62 are input to the travel control unit 16.

Signals indicating motion state quantities of the vehicle 10 necessary for driving support control of the vehicle such as a yaw rate, longitudinal and lateral accelerations of the vehicle 10 are also input to the travel control unit 16 from the motion state quantity detection device 64. Image information in front of the vehicle and information on a driving lane may be acquired by means other than the CCD camera 60 or may be acquired by a combination of the CCD camera 60 and other device.

The EPS control unit 14 and the travel control unit 16 each include a microcomputer having a CPU, a ROM, a RAM, and an input/output port device, which are connected to each other by a bi-directional common bus. The EPS control unit 14 and the travel control unit 16 exchange information mutually by communication as necessary.

As described in detail later, the travel control unit 16, according to the flowchart shown in FIGS. 2 and 3, calculates a change amount Δθat of the steering angle θ for making the vehicle travel along the target trajectory. The change amount Δθeat is calculated in consideration of the necessity of a lane change, a steering status of the driver and the like, and a determination whether or not the LKA control is to be terminated is also performed based on a steering status of the driver. Further, the travel control unit 16 calculates a steering torque Tadt of the LKA control for changing a steering angle θ by the change amount Δθat. The EPS control apparatus 14, according to the flowchart shown in FIGS. 5 and 6, calculates a final target steering assist torque Tatf as a sum of a target steering assist torque Tat for reducing a steering load of the driver as well as improving the driver's steering feeling and the steering torque Tadt of the LKA control. Further, the EPS control unit 14 controls the electric power steering device 12 so that a steering assist torque Ta conforms to the final target steering assist torque Tatf.

As understood from the above explanation, the travel control unit 16 and the EPS control unit 14 cooperate with each other to execute the autonomous driving by making the vehicle run along the target trajectory. In the LKA control, the driving lane is specified based on an image information in front of the vehicle taken by the CCD camera 60, and a target trajectory is set as a target course passing through the center of the driving lane. However, the target trajectory may be a line passing through a position other than the center of a driving lane, or may be a trajectory for preventing the vehicle from deviating from the driving lane. Notably, in autonomous driving, the braking/driving force of the vehicle may be autonomously controlled as necessary.

Figure 2:
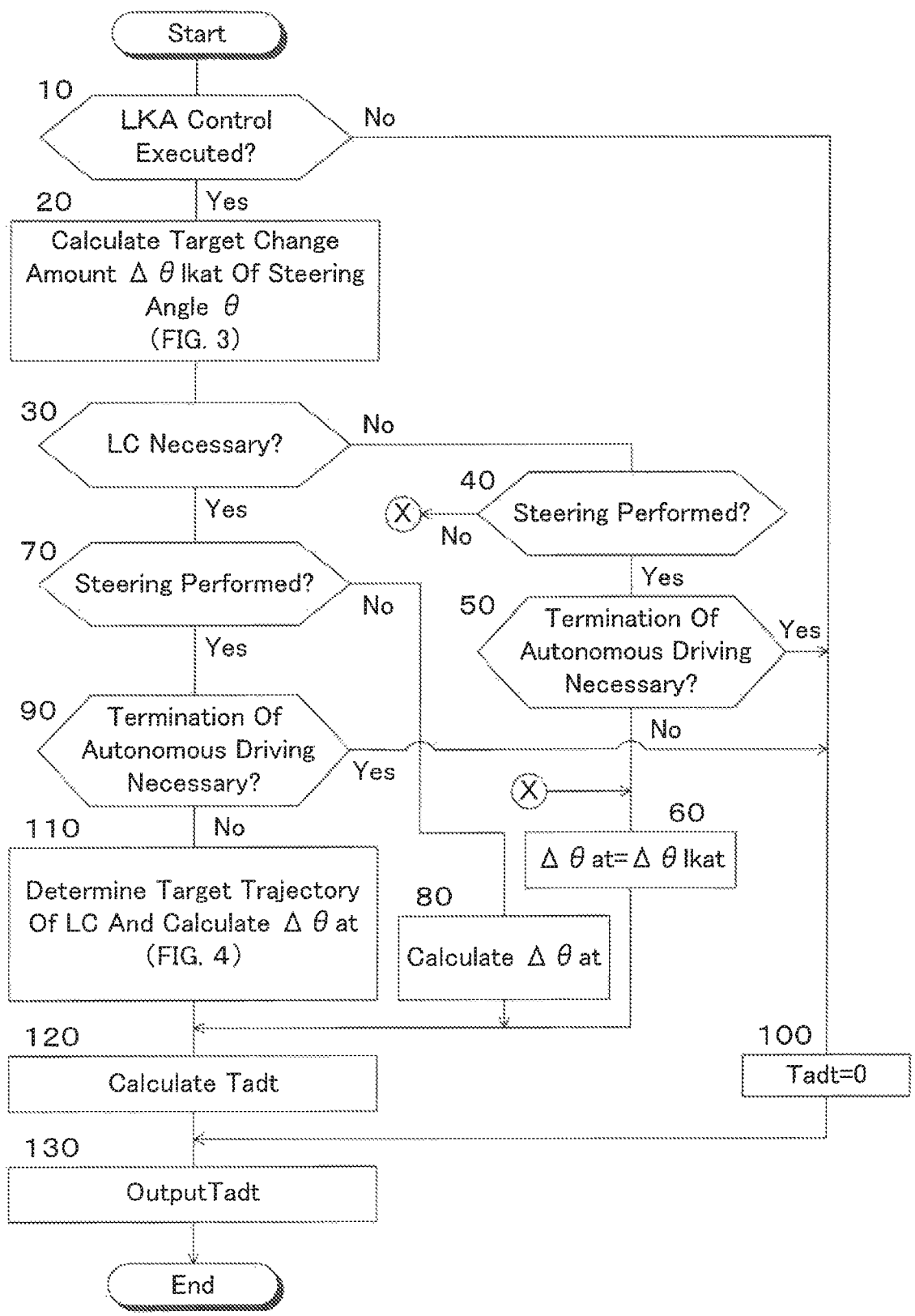
FIG. 2 is a flowchart showing a calculation control routine of a target steering torque Tadt of LKA control in the embodiment.
Figure 4:
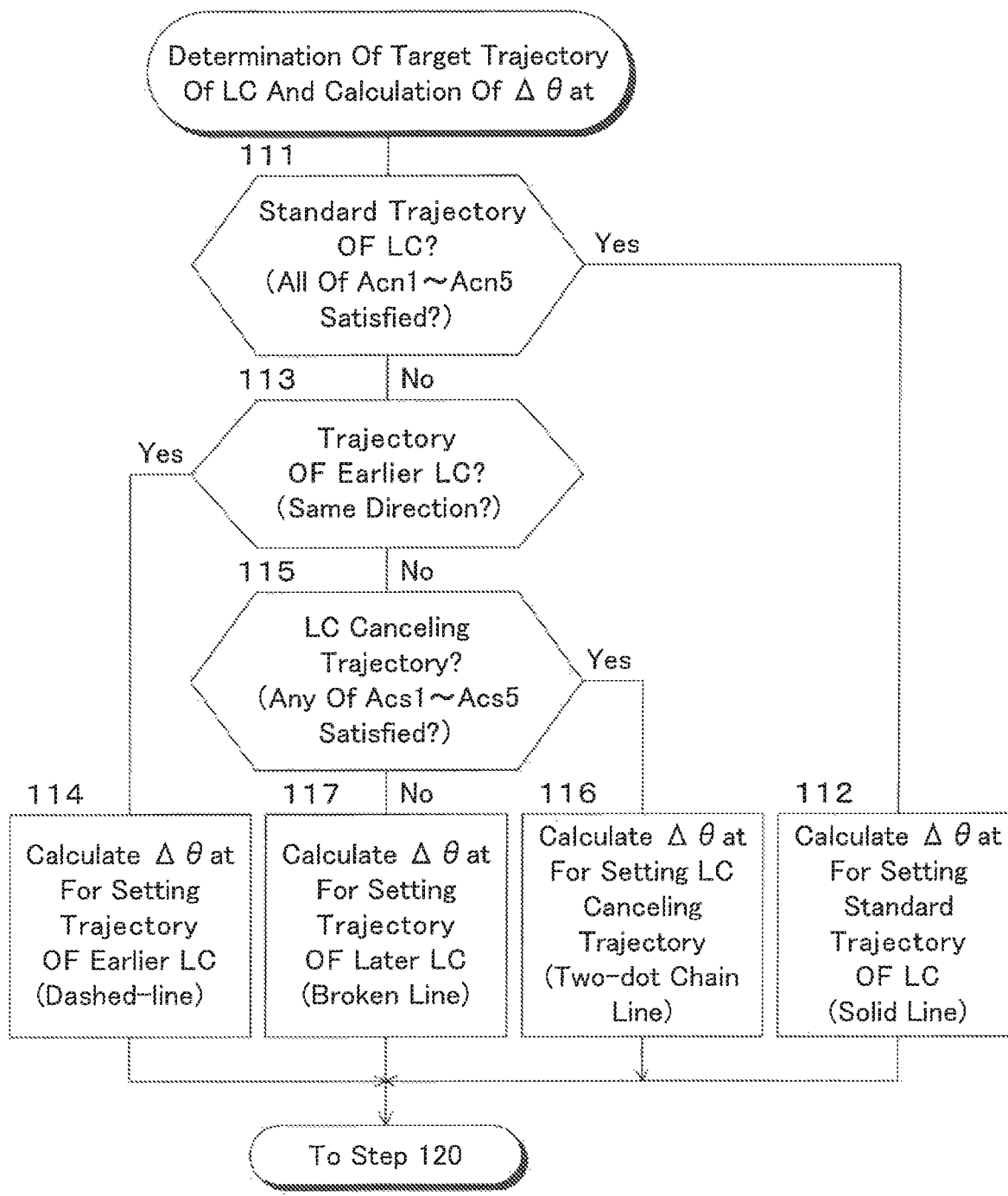
FIG. 4 is a flowchart showing routines of target trajectory determination of the lane change and calculation of a target change amount $\Delta\theta at$ of a steering angle $\theta$ executed in step 110 in the flowchart shown in FIG. 2.

Further, the travel control unit 16, when executing the LKA control, according to the flowchart shown in FIGS. 2 and 4, determines whether or not the autonomous driving should be stopped and a lane change is necessary. The travel control unit 16, when determining that a lane change is necessary, determines whether or not it is necessary to change the target trajectory of the lane change, and changes the target trajectory of the lane change in accordance with the determination result.

<Calculation of Steering Torque Tadt for LKA Control>

Next, with reference to the flow charts shown in FIGS. 2 and 3, the calculation control routine of the target steering torque Tadt for the LKA control in the embodiment will be described. The control according to the flowcharts shown in FIG. 2 is repeatedly executed at predetermined time intervals by the travel control unit 16 when an ignition switch (not shown) is on. Note that the control according to the flowcharts shown in FIG. 2 is simply referred to as "LKA control" and a lane change is expressed as "LC".

It will now be described the calculation control routine of the target steering torque T ad t of LKA control in embodiments with reference to the flowchart shown in FIGS. 2 and 3. The control according to the flowchart shown in FIG. 2, when an ignition switch not shown in the figure is on, and is repeatedly executed at every predetermined time by the travel control unit 16. Incidentally, the control according to the flowchart shown in FIG. 2, simply referred finger as "LKA control", lane change (lane change) is referred to as "LC."

First, in step 10, it is determined whether or not the LKA control is being executed. When a negative determination is made, the LICA control proceeds to step 100, and when an affirmative determination is made, the LKA control proceeds to step 20. It is to be noted that the LKA control is performed when the selection switch 62 is on and preset permission conditions (e.g., the EPS control unit 14 is normal) and possible conditions (for example, it is possible to specify a driving lane by recognizing a white line on a road) are satisfied.

Figure 3:
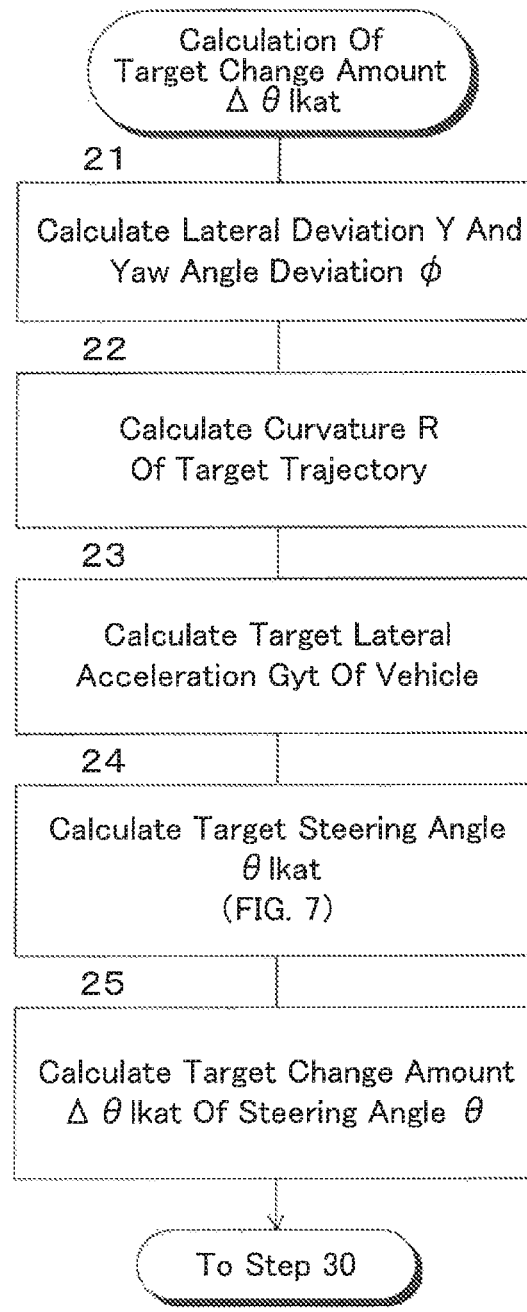
FIG. 3 is a flowchart showing a calculation routine of a target correction amount $\Delta\theta lkat$ executed in step 20 in the flowchart shown in FIG. 2.

In step 20, according to the flowchart shown in FIG. 3, a target change amount Δθlkat of a steering angle θ necessary for making the vehicle travel along the target trajectory is calculated based on a corrected lateral deviation Ya and a corrected yaw angular deviation φa. The target change amount Δθlkat of the steering angle θ is calculated as a value corresponding to a target change amount of the steered angle of the front wheels 20FL and 20FR that are steered wheels.

In step 30, a determination is made as to whether or not lane change is necessary in order for the vehicle to travel along the target trajectory determined in step 20. When an affirmative decision is made, the LKA control proceeds to step 70, and when a negative determination is made, the LKA control proceeds to step 40.

In step 40, for example, by determination of whether or not a steering angle θ is changing, a determination is made as to whether or not a driver is steering. When a negative decision is made, the LKA control proceeds to step 60, and when a positive determination is made, the LKA control proceeds to step 50.

In step 50, a determination is made as to whether or not the control of a steered angle of the front wheel by the LKA control, that is, the autonomous driving is to be terminated. When an affirmative determination is made, the LKA control proceeds to step 100. When a negative determination is made, in step 60, a change amount $\Delta\theta at$ of the steering angle $\theta$ for making the vehicle travel along the target trajectory is set to the target change amount $\Delta\theta lkat$ calculated in step 20, and then LKA control proceeds to step 120. An affirmative determination is made in step 50 when, for example, as shown by a thin two-dot chain line arrow in FIG. 12, the driver intends to make the vehicle travel so as to move greatly away from the trajectory 104n of the standard lane change (a solid line arrow).

Incidentally, when at least one of the following conditions Ance1 to Ance5 is satisfied, it may be determined that the autonomous driving is to be terminated. The conditions Ance1 to Ance5 are conditions concerning a steering torque T, a steering angle $\theta$, a steering angular velocity $\theta d$ (a time differentiated value of a steering angle $\theta$), a deviation $\Delta\theta t$ of a steering angle (a difference between a steering angle $\theta$ and a target steering angle $\Delta\theta lkat$) and a lateral deviation Y (a deviation of a lateral position of the vehicle with respect to a target trajectory. See step 21 described below.). The steering torque T, the steering angle $\theta$, the steering angular velocity $\theta d$, the deviation $\Delta\theta t$ of the steering angle and the lateral deviation Y are index values which change in accordance with the driver's steering operation, and are index values for determining the drivers intention regarding the trajectory of the lane change. Reference values Tnce, $\theta$nce, $\theta$dnce, $\Delta\theta$tnce and Ynce are all positive constants, and are second reference values of autonomous driving termination for determining whether or not the autonomous driving is to be terminated in a situation where a lane change is not performed.

| | |
|---|---|
| $\|T\| \geq Tnce$ | Condition Ance1: |
| $\|\theta\| \geq \theta nce$ | Condition Ance2 |
| $\|\theta d\| \geq \theta dnce$ | Condition Ance3 |
| $\|\Delta\theta t\| \geq \Delta\theta tnce$ | Condition Ance4: |
| $\|Y\| \geq Ynce$ | Condition Ance5: |

In step 70, similarly to step 40, a determination is made as to whether or not the driver is steering. When an affirmative determination is made, the LKA control proceeds to step 90, and when a negative determination is made, the LKA control proceeds to step 80.

Figure 12:
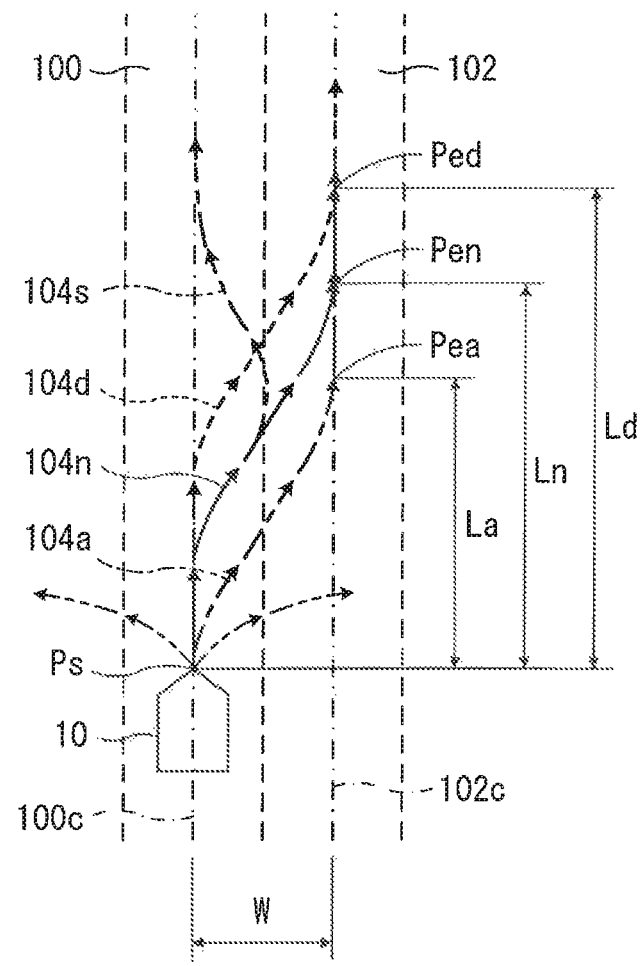
FIG. 12 is a diagram showing various target trajectories of lane change determined in step 110 in the flowchart shown in FIG. 2.

In step 80, as indicated by a solid line arrow in FIG. 12, a target change amount $\Delta\theta at$ of a steering angle $\theta$ for making the vehicle travel along the preset standard lane change trajectory 104n is calculated. Note that a plurality of target lane change trajectories are set depending on the width of a lane and a vehicle speed and are stored in the ROM. A target steering angle $\theta lct$ corresponding to the position of the vehicle with respect to the lane is set for each target lane change trajectory. Therefore, the target change amount $\Delta\theta at$ is calculated as a deviation $\theta lct - \theta$ between a target steering angle $\theta lct$ for a lane change and a current steering angle $\theta$. The same applies to a late lane change trajectory 104d, an earlier lane change trajectory 104a, and the lane change canceling trajectory 104s, which will be described later.

In step 90, similarly to step 50, a determination is made as to whether or not the control of a steered angle of the front wheel by the LKA control, that is, the autonomous driving is to be terminated. When a negative determination is made, the LKA control proceeds to step 110. When an affirmative determination is made, in step 100, a target steering torque Tadt of the LKA control is set to 0, and then the LKA control proceeds to step 130. An affirmative determination is made in step 90 when, for example, as shown by a thin two-dot chain line arrow in FIG. 12, the driver intends to make the vehicle travel so as to move greatly away from the trajectory 104n of the standard lane change (a solid line arrow). When step 100 is once executed, a negative determination is made in step 10.

Incidentally, when at least one of the following conditions Ace1 to Ace5 is satisfied, it may be determined that the autonomous driving is to be terminated. Conditions Ace1 to Ace5 are conditions concerning a steering torque T, a steering angle $\theta$, a steering angular velocity $\theta d$, a deviation $\Delta\theta t$ of a steering angle and a lateral deviation Y. Reference values Tce, $\theta$ce, $\theta$dce, $\Delta\theta$tce and Yce are positive constants that are greater than the second reference values Tnce, $\theta$nce, $\theta$dnce, $\Delta\theta$tnce and Ynce, respectively, and are first reference values of autonomous driving termination for determining whether or not the autonomous driving is to be terminated in a situation where a lane change by the autonomous driving is necessary.

| | |
|---|---|
| $\|T\| \geq Tce$ | Condition Ace1: |
| $\|\theta\| \geq \theta ce$ | Condition Ace2 |
| $\|\theta d\| \geq \theta dce$ | Condition Ace3 |
| $\|\Delta\theta t\| \geq \Delta\theta tce$ | Condition Ace4: |
| $\|Y\| \geq Yce$ | Condition Ace5: |

In step 110, according to the flowchart shown in FIG. 4, it is determined the target trajectory of the lane change should be set to which one of the standard lane change trajectory 104n, the later lane change trajectory 104d, the earlier lane change trajectory 104a and the lane change canceling trajectory 104s that are indicated by the solid line, the broken line, the one-dot chain line, the two-dot chain line arrows in FIG. 12. Further, a target change amount $\Delta\theta at$ of a steering angle $\theta$ necessary to achieve the lane change with the determined trajectory is calculated.

Incidentally, in FIG. 12, the numerals 100 and 102 indicate a lane before lane change and a lane after lane change, respectively, and the numerals 100c and 102c indicate middle lines of the lane 100 and 102, respectively. Point Ps indicates a position of the front end of the vehicle 10 when a target trajectory of the lane change is determined. Points Pen, Ped and Pea indicate positions of the front end of the vehicle for the trajectory 104n, 104d and 104a, respectively when the lane change is terminated. Ln, Ld and La represent the distances between a point Ps and the points Pen, Ped and Pea in a direction along the center lines 100c and 102c. W represents the distance between the center lines 100c and 102c.

Late lane change distance Lead is larger than the standard lane change distance Ln and earlier lane change distance La is smaller than the standard lane change distance Ln. The distances Ln, Ld and La increase as a vehicle speed V increases, as viewed from the same trajectory of the lane change. Therefore, a magnitude of a target change amount $\Delta\theta at$ of the steering angle $\theta$ decreases as a vehicle speed V increases. The distance W is determined by the width of the lanes 100 and 102 irrespective of which trajectory of the lane change is, and it increases as the width of the lane increases.

In step 120, a target steering torque Tadt of LKA control is calculated as a torque for changing a steering angle θ by the target change amount Δθat by the PID compensation calculation based on the target change amount Δθat.

In step 130, a signal indicating the target steering torque Tadt of the LKA control is output from the LKA control unit 16 to the EPS control unit 14. Therefore, in a step 240 to be described later, a final target steering assist torque Tatf is calculated as a sum of the target steering assist torque Tat and the target steering torque Tadt, and in step 250, a steered angle of the front wheels 20 FL and 20 FR is controlled so that the vehicle 10 travels along the target trajectory where the lane change is performed.

<Calculation of Target Change Amount Δθlkat>

Next, with reference to the flowchart shown in FIG. 3, the calculation routine of a target change amount Δθlkat executed in step 20 is described.

First, in step 21, a target trajectory of the vehicle along a running road is determined by analyzing an image information ahead of the vehicle 10 taken by the CCD camera 60 or the like. Further, a lateral deviation Y which is a lateral deviation of the vehicle 10 with respect to the target trajectory and the yaw angle deviation φ which is an angle formed by the longitudinal direction of the vehicle 10 with respect to the target trajectory are calculated. In the embodiment, both a target value of a lateral position of the vehicle 18 with respect to the target trajectory and a target value of an angle formed by the longitudinal direction of the vehicle 18 with respect to the target trajectory are 0. However, at least one of them may not be 0.

The determination of a target trajectory of the vehicle 10 may be performed based on information from a navigation device not shown in the drawings or based on a combination of analysis of image information and information from a navigation device. Further, a lateral deviation Y and a yaw angle deviation φ are parameters necessary for performing the trajectory control for causing the vehicle to travel along a target trajectory, but since the calculation procedure does not form the gist of the present disclosure, these parameters may be calculated in an arbitrary manner.

In step 22, a curvature R (a reciprocal of a radius) of the target trajectory is calculated in a manner known in the art.

In step 23, on the basis of the lateral deviation Ya, the yaw angle deviation φa and the curvature R, a target lateral acceleration Gyt is calculated as a target turning state quantity of the vehicle 10 necessary for running the vehicle along the target trajectory. The target lateral acceleration Gyt may be calculated by a function of the lateral deviation Ya, the yaw angle deviation φa and the curvature R. Alternatively, a map may be set which shows a relationship among the lateral deviation Ya, the yaw angle deviation φa and the curvature R and the target lateral acceleration Gyt, and the target lateral acceleration Gyt may be calculated from the map.

Figure 7:
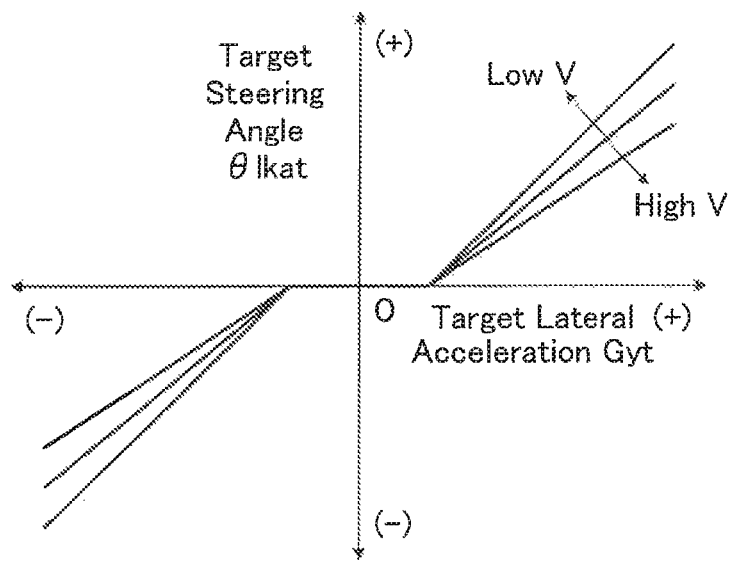
FIG. 7 is a diagram showing a map for calculating a target steering angle $\theta lkat$ of the LKA control based on a target lateral acceleration Gyt and a vehicle speed V of the vehicle.

In step 24, a target steering angle θlkat for trajectory control is calculated by referring to the map shown in FIG. 7 on the basis of the target lateral acceleration Gyt and a vehicle speed V of the vehicle. As shown in FIG. 7, a target steering angle θlkat is calculated such that the larger the absolute value of the target lateral acceleration Gyt is, the larger the magnitude of the target steering angle is, and the higher a vehicle speed is, the smaller the target steering angle is.

In step 25, a target change amount Δθlkat, which is a correction amount of a steering angle θ required to make the vehicle 10 travel along the target trajectory, is calculated as a difference (θlkat−θ) between the target steering angle θlkat and the steering angle θ.

<Determination of Target Trajectory of Lane Change and Calculation of Target Change Amount Δθat>

Next, with reference to the flowchart shown in FIG. 4, a routine for determining a target trajectory of the lane change and calculating a target change amount Δθat, which is executed in step 110, will be described.

First, in step 111, a determination is made as to whether or not a target trajectory of the lane change should be set to the trajectory of the standard lane change. When a negative determination is made, the LKA control proceeds to step 113. When an affirmative determination is made, the target trajectory of the lane change is set to the trajectory of the standard lane change in step 112. In addition, a target change amount Δθat of the steering angle θ necessary for running the vehicle along the trajectory of the standard lane change 104*n* (solid arrow in FIG. 12) is calculated as a difference θlct−θ between the target steering angle θlct for a lane change and a current steering angle θ. An affirmative determination is made in step 111 when the driver agrees that the vehicle will travel along the trajectory of the standard lane change.

Incidentally, when all of the following conditions Acn1 to Acn5 which are the conditions regarding a steering torque T, a steering angle θ, a steering angular velocity θd, a deviation Δθt of the steering angle and a lateral deviation Y are satisfied, it may be determined that the target trajectory of the lane change should be set to the standard lane change. Reference values Tcn, θcn, θdcn, Δθtcn and Ycn are standard reference values and are positive constants smaller than the second reference values Tnce, θnce, θdnce, Δθtnce and Ynce, respectively.

| | |
|---|---|
| $\|T\| \leq Tcn$ | Condition Acn1: |
| $\|\theta\| \leq \theta cn$ | Condition Acn2 |
| $\|\theta d\| \leq \theta dcn$ | Condition Acn3 |
| $\|\Delta\theta t\| \leq \Delta\theta tcn$ | Condition Acn4: |
| $\|Y\| \leq Ycn$ | Condition Acn5: |

In step 113, a determination is made as to whether or not the target trajectory of lane change should be set to the trajectory of the earlier lane change by determining whether or not the direction of steering by the driver is the same as the direction of steering for lane change. The earlier lane change is a lane change in which a lane change starts earlier and ends earlier than the standard lane change. When a negative determination is made, the LKA control proceeds to step 115. When an affirmative determination is made, the target trajectory of the lane change is set to the trajectory of the earlier lane change in step 114. In addition, a target change amount Δθat of the steering angle θ necessary to make the vehicle travel along the trajectory of the earlier lane change 104*a* (one-dot chain line arrow in FIG. 12) is calculated as a deviation θlct−θas between the target steering angle θlct for the lane change and a current steering angle θ. An affirmative determination is made in step 113 when the driver wishes to change the lane earlier than the standard lane change.

In step 115, it is determined whether or not the lane change should be canceled. When a negative determination is made, the LKA control proceeds to step 117. When an affirmative determination is made, it is determined in step 116 that the lane change should be canceled. In addition, a target change amount Δθat of the steering angle θ for canceling the lane change is calculated as the deviation θlct−θ between the target steering angle θlct for making the vehicle travel on the original lane and a current steering angle θ.

The affirmative determination is made in step 115 when, as shown by a thick two-dot chain line arrow as the trajectory 104s in FIG. 12, the driver intends to deviate from the standard lane change trajectory 104n (solid arrow) and to run the vehicle on the original lane. Thus, the lane change is canceled, but the autonomous driving is continued. In contrast, the negative determination is made in step 115 when the driver wishes to change the lane change to a later lane change that is later than the standard lane change. The later lane change is a lane change in which lane change starts later and ends later than the standard lane change.

Incidentally, it may be determined that the lane change should be canceled when at least one of the following conditions Acs1 to Acs5 which are the conditions for a steering torque T, a steering angle θ, a steering angular velocity θd, a deviation Δθt of the steering angle and a lateral deviation Y, respectively are satisfied. The reference values Tcs, θcs, θdcs, Δθtcs and Ycs are autonomous driving cancellation reference values and are positive constants which are larger than the standard reference values Tcn, θcn, θdcn, Δθtcn and Ycn, respectively and smaller than the second reference values Tnce, θnce, θdnce, Δθtnce and Ynce, respectively.

| | |
|---|---|
| $Tcs<|T|<Tce$ | Condition Acs1: |
| $θcs<|θ|<θce$ | Condition Acs2 |
| $θdcs<|θd|<θdce$ | Condition Acs3 |
| $Δθtcs<|Δθt|<Δθtce$ | Condition Acs4: |
| $Ycs<|Y|<Yce$ | Condition Acs5: |

In step 117, a target trajectory of lane change is set to the trajectory of the later lane change. Further, a target change amount Δθat of the steering angle θ necessary for running the vehicle along the trajectory of the later lane change 104d (broken-line arrow in FIG. 12) is calculated as a deviation θlct−θ between a target steering angle θlct of the later lane change and a current steering angle θ.

<Steering Assist Torque Control>

Figure 5:
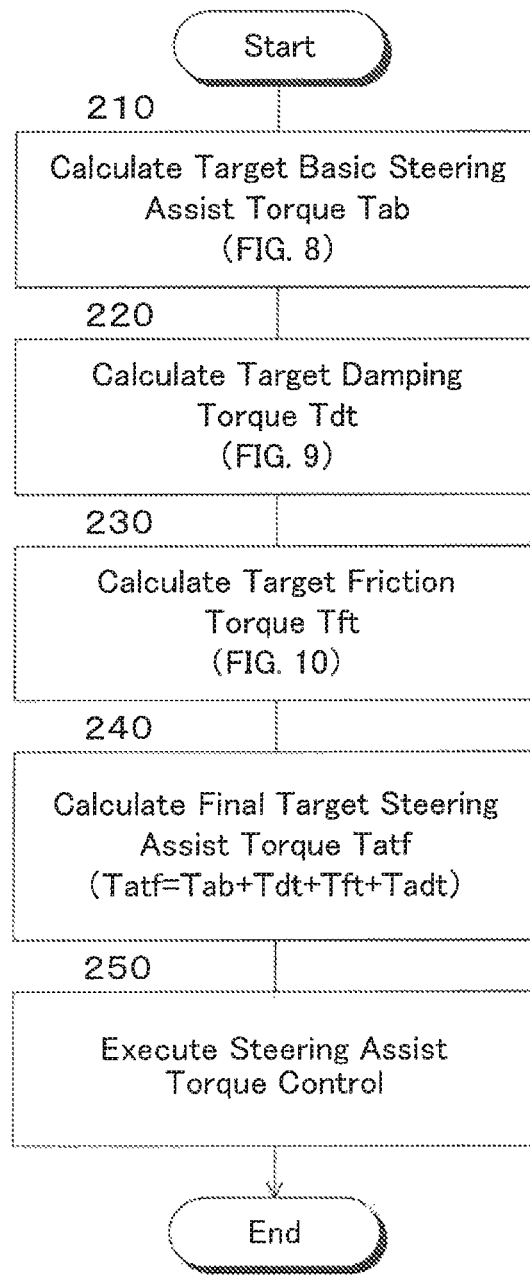
FIG. 5 is a flowchart showing a steering assist torque control routine in the embodiment.

Next, the steering assist torque control routine in the embodiment will be described with reference to the flowchart shown in FIG. 5. The control according to the flowchart shown in FIG. 5 is repeatedly executed at predetermined time intervals by the EPS control unit 14 when the ignition switch, not shown, is on.

Figure 8:
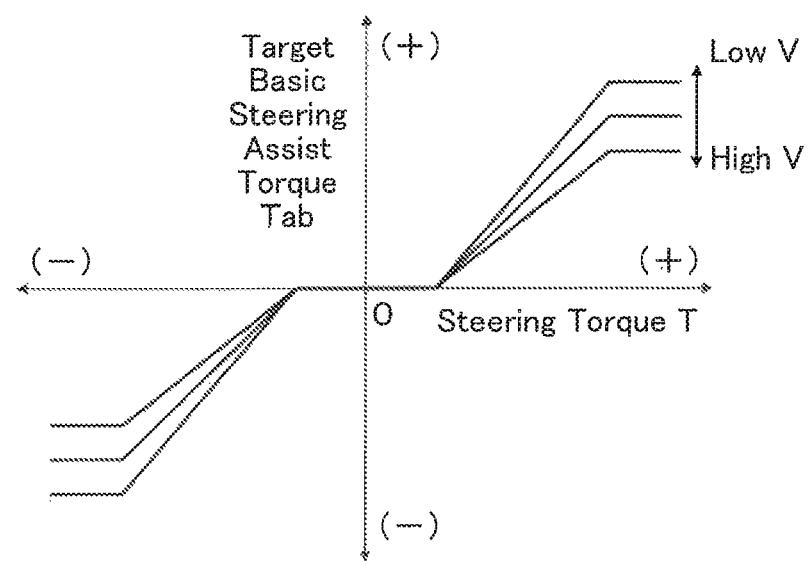
FIG. 8 is a diagram showing a map for calculating a target basic steering assist torque Tab on the basis of a steering torque T and a vehicle speed V.

First, in step 210, the map shown in FIG. 8 is referred to based on a steering torque T and a vehicle speed V to calculate a target basic steering assist torque Tab for reducing the driver's steering burden. As shown in FIG. 8, the target basic steering assist torque Tab is calculated such that the absolute value increases as the absolute value of the steering torque T increases and the absolute value increases as the vehicle speed V decreases.

Figure 9:
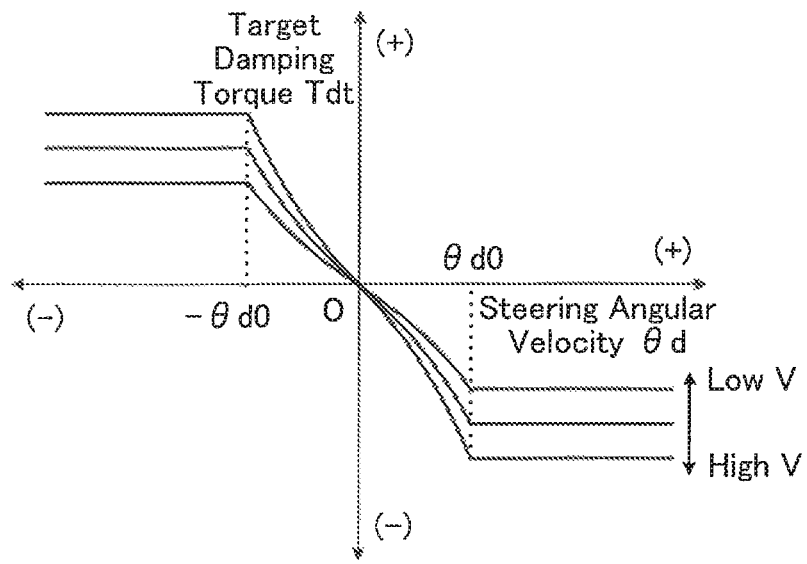
FIG. 9 is a diagram showing a map for calculating a target damping torque Tdt based on a steering angular velocity $\theta d$ and a vehicle speed V.

In step 220, for example, a steering angular velocity θd is calculated as a time differentiated value of a steering angle θ, and based on the steering angular velocity θd and a vehicle velocity V, the map shown in FIG. 9 is referred to, whereby a target damping torque Tdt which is the component of the steering assist torque damping control is calculated. The target damping torque Tdt is calculated so that an absolute value of the target damping torque Tdt increases as a vehicle speed V increases, the absolute value increases as the absolute value of the steering angular velocity θd increases when the absolute value of the steering angular velocity θd is less than the reference value θd0 (a positive value), and the target damping torque is a constant value when the absolute value of the steering angular velocity θd is equal to or larger than the reference value θd0.

Figure 6:
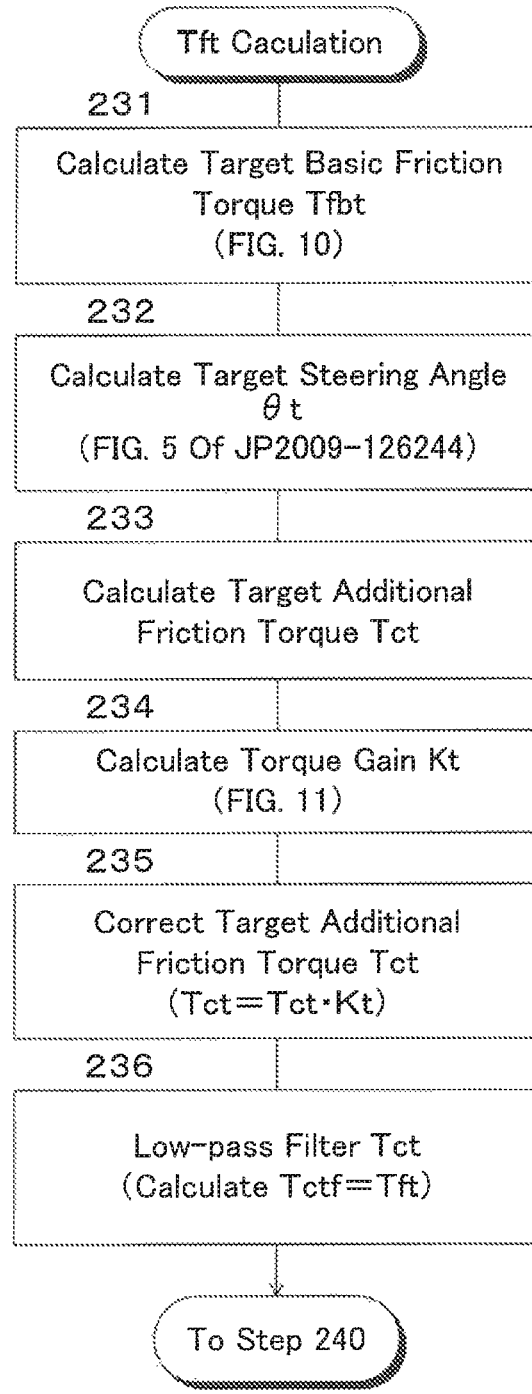
FIG. 6 is a flowchart showing a calculation routine of a target friction torque Tft executed in step 230 in the flowchart shown in FIG. 5.

In step 230, a target friction torque Tft which is the friction control component of the steering assist torque is calculated according to the flowchart shown in FIG. 6. The target damping torque Tdt is a torque for reducing the wobble of the steering wheel 22 and the target friction torque Tft is a torque for giving a moderate resistance to the steering, each of which acts as a drag torque against steering operation.

In step 240, a final target steering assist torque Tatf is calculated as a sum (Tab+Tdt+Tft+Tadt) of the target basic steering assist torque Tab, the target damping torque Tdt, the target friction torque Tft, and the target steering torque Tadt of the LKA control. The sum of the target basic steering assist torque Tab, the target damping torque Tdt and the target friction torque Tft is a target steering assist torque Tat for reducing the driver's steering burden and improving the driver's steering feeling. Therefore, the final target steering assist torque Tatf is calculated as the sum (Tat+Tadt) of the target steering assist torque Tat and the target steering torque Tadt for the LKA control. The target steering assist torque Tat is not limited to the sum of the torques and may be calculated as a sum of arbitrary torques known in the art.

In step 250, the power steering device 12 is controlled based on the final target steering assist torque Tatf so that the steering assist torque Ta of the power steering device 12 conforms to the final target steering assist torque Tatf. Consequently, the steering assist torque conforms to the target steering assist torque Tat and the steering torque of the LKA control is controlled to be the target steering torque Tadt. Therefore, by controlling a change amount of the steering angle θ to the target change amount Δθat, the steered angle of the front wheels 20FL and 20FR serving as the steered wheels is changed by the target change amount corresponding to the target change amount Δθat.

<Calculation of Target Friction Torque Tft>

Next, with reference to the flowchart shown in FIG. 6, the calculation routine of the target friction torque Tft executed in step 230 will be described.

Figure 10:
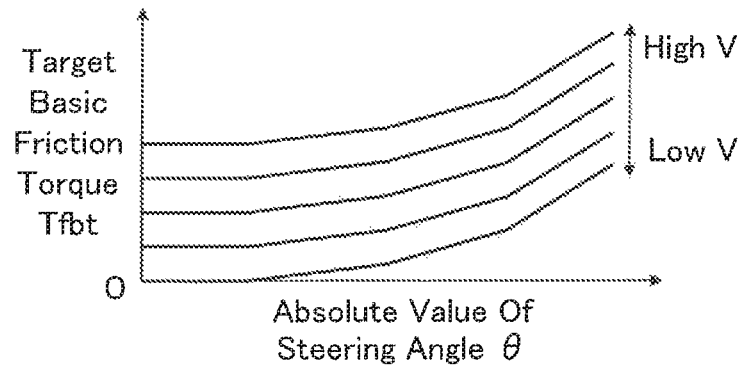
FIG. 10 is a diagram showing a map for calculating a target basic friction torque Tftb on the basis of an absolute value of a steering angle $\theta$ and a vehicle speed V.

First, in step 231, based on an absolute value of the steering angle θ and a vehicle speed V, a target basic friction torque Tfbt is calculated from the map shown in FIG. 10. As shown in FIG. 10, the target basic friction torque Tfbt is calculated such that it increases as the absolute value of the steering angle θ increases, and increases as the vehicle speed V increases.

Although not shown in the drawings, when a vehicle speed V is in a middle to a high vehicle speed range, a self-aligning torque Tsat increases as an absolute value of the steering angle θ increases. Therefore, in order to reduce the required steering force in the range where a magnitude of the steering angle θ is large and to improve the convergence of the steering, the target basic friction torque Tfbt is calculated to have a larger value as an absolute value of the steering angle θ is larger. Further, the self-aligning torque Tsat increases as a vehicle speed V increases. Therefore, the target basic friction torque Tfbt is calculated to a larger value as a vehicle speed V is higher so as to reduce a necessary steering force at medium to high speed traveling as a vehicle speed V is higher to enhance the convergence of the steering and to reduce the steering resistance during low speed traveling.

In step 232, a target steering angle θft for controlling the friction torque is calculated. Incidentally, the target steering angle θt may be calculated in the same manner as the calculation of the target steering angle θft performed according to the flowchart shown in FIG. 5 of Japanese Patent Application Laid-open No. 2009-126244, for example.

In step 233, a target additional friction torque Tct is calculated based on the steering angle θ and the target steering angle θft according to the following formula (1). The gain K in the following equation (1) is a positive value. As understood from the following equation (1), the sign of the target additional friction torque Tct, that is, its action direction is determined by the magnitude relation of the steering angle θ and the target steering angle θft.

$$Tct = K(\theta ft - \theta) \quad (1)$$

Figure 11:
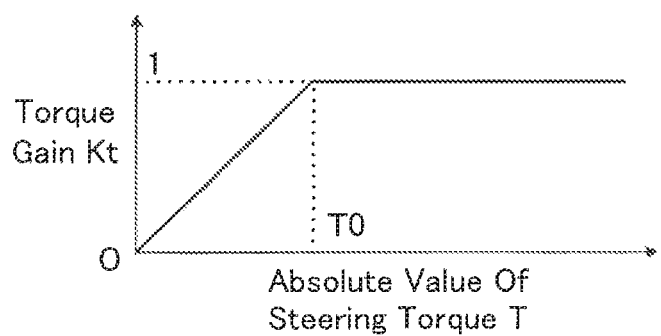
FIG. 11 is a diagram showing a map for calculating a torque gain Kt based on an absolute value of a steering torque T.

In step 234, a torque gain Kt is calculated from the map shown in FIG. 11 based on an absolute value of the steering torque T. When the absolute value of the steering torque T is less than a reference value T0 (a positive value), the larger the absolute value of the steering torque T is, the larger the torque gain Kt becomes in the range from 0 to 1 but less than 1, and when the absolute value of the steering torque T When the value is equal to or larger than the reference value T0, the torque gain is 1.

In step 235, the target additional friction torque Tct is corrected by multiplying the target additional friction torque Tct by the torque gain Kt.

In step 236, the corrected target additional friction torque Tct is low-pass filtered so that the target friction torque Tft is calculated as the target additional friction torque Tctf after the low-pass filtering in which the high frequency noise component has been removed.

As can be seen from the above description, according to the embodiment, when a lane change is to be executed by the autonomous driving and a steering operation is being performed by the driver, affirmative determinations are made in steps 30 and 70, and step 90 and the following steps are executed. When the magnitudes of all the index values such as the steering torque T are smaller than the corresponding first termination reference values of autonomous driving, a negative determination is made in step 90. Accordingly, in step 110, the target trajectory of the lane change is changed in accordance with the magnitude of the index value without terminating the autonomous driving. Therefore, the driver can change the target trajectory of the lane change according to the magnitude of the index value without terminating the automatic operation by performing a steering operation in a range where the magnitudes of the index values are smaller than the first termination reference values of autonomous driving when the lane change by the autonomous driving is executed.

Further, in step 110, according to the flowchart shown in FIG. 4, the driver's intention regarding the trajectory of the lane change is determined according to the magnitudes of the index values for determining the driver's intention regarding the trajectory of the lane change, which are index values that change according to the driver's steering operation. Accordingly, the driver can make the lane change be executed with the trajectory reflecting the intention of the driver by performing a steering operation without the need for performing any special operation other than the steering operation.

In embodiments, the index values that change according to a driver's steering operation and are used to determine the intention of the driver regarding the trajectory of the lane change are a steering torque T, a steering angle θ, a steering angular velocity θd, a deviation of the steering angle Δθt and a lateral deviation V. According to these index values, it is possible to determine the driver's intention regarding the trajectory of the lane change accurately. Thus, when the magnitudes of all the index values are smaller than the corresponding first termination reference values of autonomous driving, the target trajectory of lane change can be changed without terminating the autonomous driving so that the driver's intention regarding the lane change appropriately reflects on the lane change based on the above five index values.

Further, according to the embodiment, when the magnitudes of all the index values are smaller than the first termination reference values of autonomous driving, step 110 is executed. In step 110, the target trajectory of the lane change is changed to one of the trajectory of the lane change earlier than the standard trajectory, the trajectory of the lane change later than the standard trajectory, and the trajectory of the lane change cancellation in accordance with the magnitudes of the index values. Accordingly, the driver can change, by performing a steering operation, the target trajectory of lane change according to the magnitudes of the index values to one of the trajectory of the lane change earlier than the standard trajectory, the trajectory of the lane change later than the standard trajectory, and the trajectory of the lane change cancellation.

Furthermore, according to the embodiment, when the magnitude of at least one of the index values is equal to or higher than the corresponding first termination reference value of autonomous driving, the autonomous driving is terminated (step 50). The first termination reference values of autonomous driving are larger than the corresponding second termination reference values of autonomous driving (step 90). Thus, it is possible to reduce the risk that the autonomous driving that the driver wishes to continue is terminated due to the driver's steering operation, for example, as compared to where the first termination reference values of autonomous driving are equal to or less than the corresponding second termination reference values of autonomous driving. Therefore, it is possible to make it easy to change the target trajectory of the lane change by the driver's steering operation while continuing the autonomous driving.

Operation of Embodiment

The operation of the autonomous vehicle 10 according to the embodiment configured as described above will be described with respect to various cases during the LKA control.

Notably, when the LKA control is not being executed, as a negative determination is made in step 10 in the flowchart shown in FIG. 2, a target steering torque Tadt of LKA control is set to 0 in step 100. Therefore, since the final target steering assist torque Tatf is calculated to be the same value as only the target steering assist torque Tat, the control of the steered angle of the front wheels 20 FL and 20 FR by the LKA control, that is, the autonomous driving is not executed.

<A. A Case where Lane Change is Unnecessary and Steering Operation is not Performed>

When the lane change is unnecessary and a steering operation is not being performed by the driver, an affirmative determination is made in step 10 in the flowchart shown in FIG. 2 and negative determinations are made in steps 30 and 40. Therefore, in step 60, the target change amount Δθat of the steering angle 9 is set to the target change amount Δθlkat calculated in step 20, and in steps 120 and 130, the target steering torque Tadt of the LKA control for making the vehicle travel along a target trajectory requiring no lane change is calculated.

<B. A Case where Lane Change is Unnecessary and Steering Operation is Performed>

When a lane change is unnecessary and a steering operation is performed by the driver, an affirmative determination is made in step 10 in the flowchart shown in FIG. 2, a negative determination is made in step 30, an affirmative determination is made in step 40. Accordingly, in step 50, it is determined whether or not the autonomous driving should be terminated by determining whether or not at least one of the conditions Ance1 to Anc5 is satisfied.

When it is determined that the autonomous driving should be terminated, the target steering torque Tadt for the LKA control is set to 0 in step 100, and in step 130, a signal indicating that the target steering torque Tadt is 0 is output from the LKA control unit 16 to the EPS control unit 14. Then a negative determination is made in step 10. Accordingly, in step 240, the final target steering assist torque Tatf is calculated to the target steering assist torque Tat, and in step 250, the steering assist torque Ta is controlled without performing the autonomous driving.

In contrast, when it is determined that the autonomous driving should not be terminated, in step 60, the target change amount Δθat of the steering angle θ is set to the target change amount Δθlkat calculated in step 20. Thus, as in the above case A, the steered angle of the front wheels is controlled so that the vehicle 10 travels along the target trajectory in which no lane change is executed.

<C. A Case where Lane Change is Necessary and Steering Operation is not Performed>

When the lane change is necessary and a steering operation is not performed by the driver, an affirmative determination is made in steps 10 and 30 in the flowchart shown in FIG. 2, and a negative determination is made in step 70. Accordingly, in step 80, a target change amount Δθ at of the steering angle θ for making the vehicle travel along the preset trajectory of the lane change is calculated and the target steering torque Tadt for the LKA control for making the vehicle travel along the target trajectory requiring lane change is calculated in steps 120 and 130. Therefore, in step 240, the final target steering assist torque Tatf is calculated to the sum of the target steering assist torque Tat and the target steering torque Tadt, and in step 250, the steered angle of the front wheels is controlled so that the vehicle 10 travels along the trajectory 104*n*.

<D. A Case where Lane Change is Necessary and Steering Operation is Performed>

When the lane change is necessary and a steering operation is being performed by the driver, an affirmative determination is made in steps 10, 30 and 70 in the flowchart shown in FIG. 2. Therefore, in step 90, it is determined whether or not the autonomous driving should be terminated by determining whether or not at least one of the above conditions Ace1 to Ace5 is satisfied.

When it is determined that the autonomous driving should be terminated, the target steering torque Tadt of the LKA control is set to 0 in step 100. Thus, the control of the steering assist torque is performed without executing the autonomous driving in the same way, as in the case where the determination to terminate the autonomous driving is made in the above case B.

In contrast, when it is determined that autonomous driving should not be terminated, in step 110, the target trajectory of the lane change is determined to one of the standard lane change trajectory, the later lane change trajectory, the earlier lane change trajectory, the lane change canceling trajectory, and a target change amount neat of the steering angle θ for achieving the lane change with the determined target trajectory is calculated. In Step 120, a target steering torque Tadt of the LKA control is calculated as a torque for changing the steering angle θ by the target change amount Δθat. Accordingly, in step 240 the final target steering assist torque Tatf is calculated as a sum of the target steering assist torque Tat and the target steering torque Tadt, and in step 250, a steered angle of the front wheels is controlled so that the vehicle 10 travels along the target trajectory of the determined lane change.

D-1. The case where all of the conditions Acn1 to Acn5 are satisfied.

In this case, in step 111 an affirmative determination is made, and in step 112 the target trajectory of the lane change is set to a standard lane change trajectory 104*n* (solid arrows in FIG. 12). Therefore, it is possible to avoid changing the target trajectory of the lane change unnecessarily to a trajectory other than the standard trajectory.

D-2. The case where any of the above conditions Acn1 to Acn5 is not satisfied and the direction of steering by the driver is the same as the direction of steering for lane change.

In this case, in step 111 in a negative discrimination is made, in step 113 an affirmative determination is made, and in step 114 the target trajectory of the lane change is set to the earlier lane change trajectory 104*a* (one-dot chain line arrow in in FIG. 12). Accordingly, by performing a steering operation so that the steered wheels are steered in the same direction as the steering direction of the steered wheels by the autonomous driving, the driver can change the target trajectory of the lane change to the trajectory of earlier lane change without the need for performing any special operation other than the steering operation.

D-3. The case where any one of the conditions Acn1 to Acn5 is not satisfied, a direction of steering by the driver is opposite to the direction of steering for changing a lane, and at least one of the conditions Acs1 to Acs5 is satisfied.

In this case, in steps 111 and 113 negative determinations are made, in step 115 an affirmative determination is made, and in step 116 it is determined that the lane change should be canceled to return to the original lane 100 (the thick double-dashed line arrow in FIG. 12). Thus, a target change amount Δθat of the steering angle θ is calculated so as to be a value that the vehicle travels along the lane change canceling trajectory 100*s*. Therefore, by performing a steering operation in a range where the magnitude of at least one of the index values is within the corresponding lane change cancellation reference range (conditions Acs1 to Acs5) so that the steered wheels are steered in the direction opposite to the steered direction of the steered wheels by the autonomous driving, the driver can change the target trajectory of the lane change to the lane change canceling trajectory without requiring a special operation other than the steering operation.

D-4. The case where any one of the conditions Acn1 to Acn5 is not satisfied, a direction of steering by the driver is opposite to the direction of steering for changing the lane, and neither of the conditions Acs1 to Acs5 is satisfied.

In this case, in steps 111, 113 and 115 negative determinations are made, and in step 117 the target trajectory of the lane change is set to the later lane change 100d (dashed arrows in FIG. 12). Therefore, by performing a steering operation in a range where the magnitudes of all the index values are not larger than the corresponding lower limit values of the lane change cancellation reference range (conditions Acs1 to Acs5) so that the steered wheels are steered in the direction opposite to the steered direction of the steered wheels by the autonomous driving, the driver can change the target trajectory of the lane change to the later lane change trajectory without requiring a special operation other than the steering operation.

Notably, in the case where the target trajectory of the lane change is changed to the earlier lane change trajectory or the later lane change trajectory, as the lane change progresses, the vehicle travels along the trajectory of the lane change desired by the driver, so that a steering operation amount of the driver decreases. Therefore, a negative determination is made in step 70, and in step 80, the target change amount $\Delta\theta at$ of the steering angle $\theta$ is calculated so that the lane change is performed on the set trajectory.

Modified Embodiment

Figure 13:
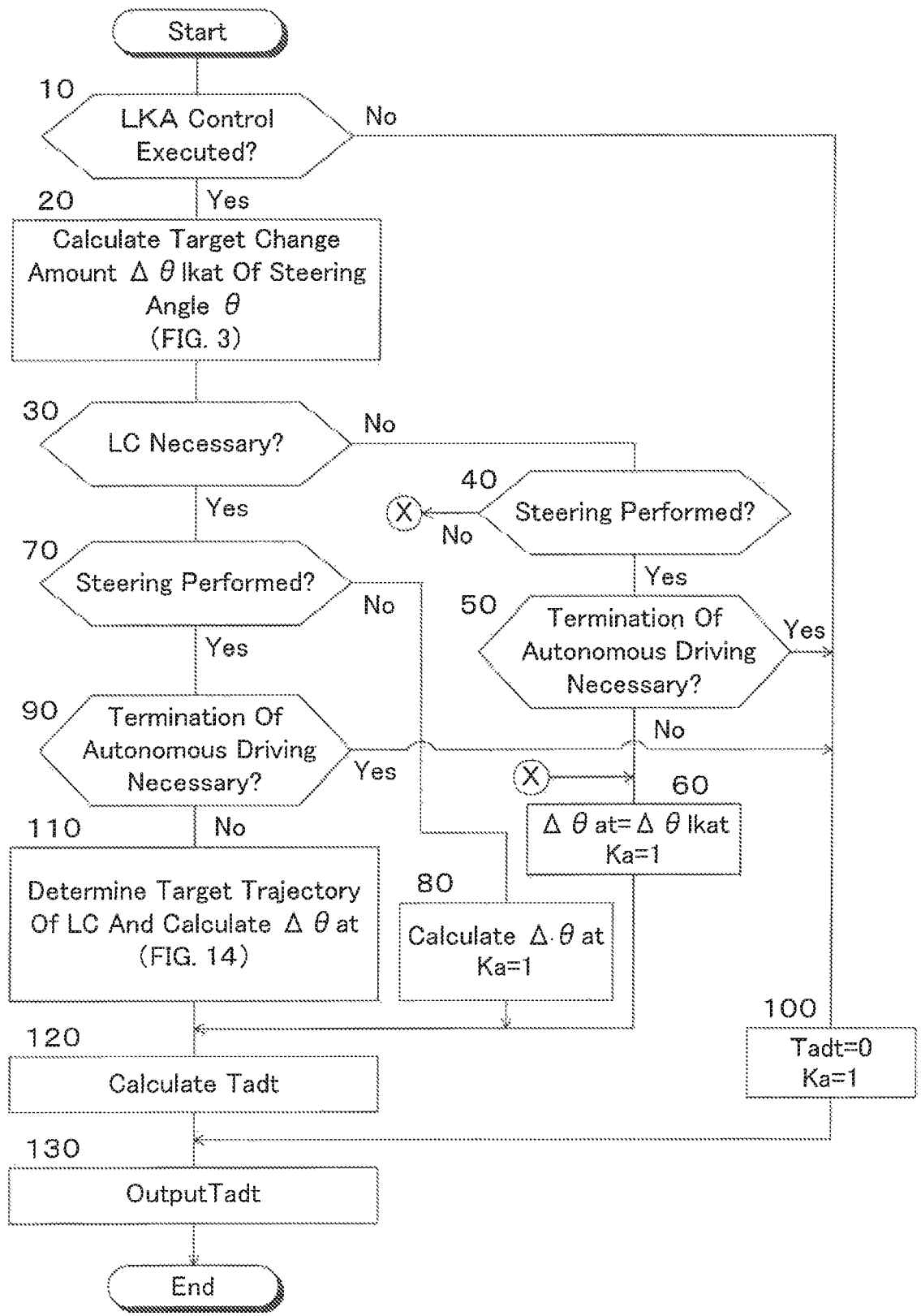
FIG. 13 is a flowchart showing a calculation control routine of a target steering torque Tadt of the LKA control in a modified embodiment.

The calculation of the target steering torque Tadt of the LKA control in the modified embodiment is performed in accordance with the flowchart shown in FIG. 13 in place of the flowchart shown in FIG. 2. The determination of the target trajectory of the lane change performed in step 110 and the calculation of the target change amount $\Delta\theta$ at of the steering angle $\theta$ are performed according to the flowchart shown in FIG. 14. Further, the steering assist torque is controlled in accordance with the flowchart shown in FIG. 15 instead of the flow chart shown in FIG. 5. Incidentally, in FIGS. 13, 14 and 15, the same steps as the steps shown in FIGS. 2, 4 and 5 respectively, are given the same step numbers as the step numbers given in FIGS. 2, 4 and 5, and the description of these steps will be omitted.

As seen from the comparison between FIGS. 13 and 2, in step 60 in FIG. 13, the target change amount $\Delta\theta at$ of the steering angle $\theta$ is set to the target change amount $\Delta\theta lkat$, and the correction coefficient Ka for the target basic steering assist torque Tab for reducing the driver's steering load is set to 1. In step 80, the target change amount $\Delta\theta at$ of the steering angle $\theta$ for making the vehicle travel along the standard lane change trajectory 104n is calculated and the correction coefficient Ka is set to 1. Further, in step 100, the target steering torque Tadt of the LKA control is set to 0 and the correction coefficient Ka is set to 1.

Figure 14:
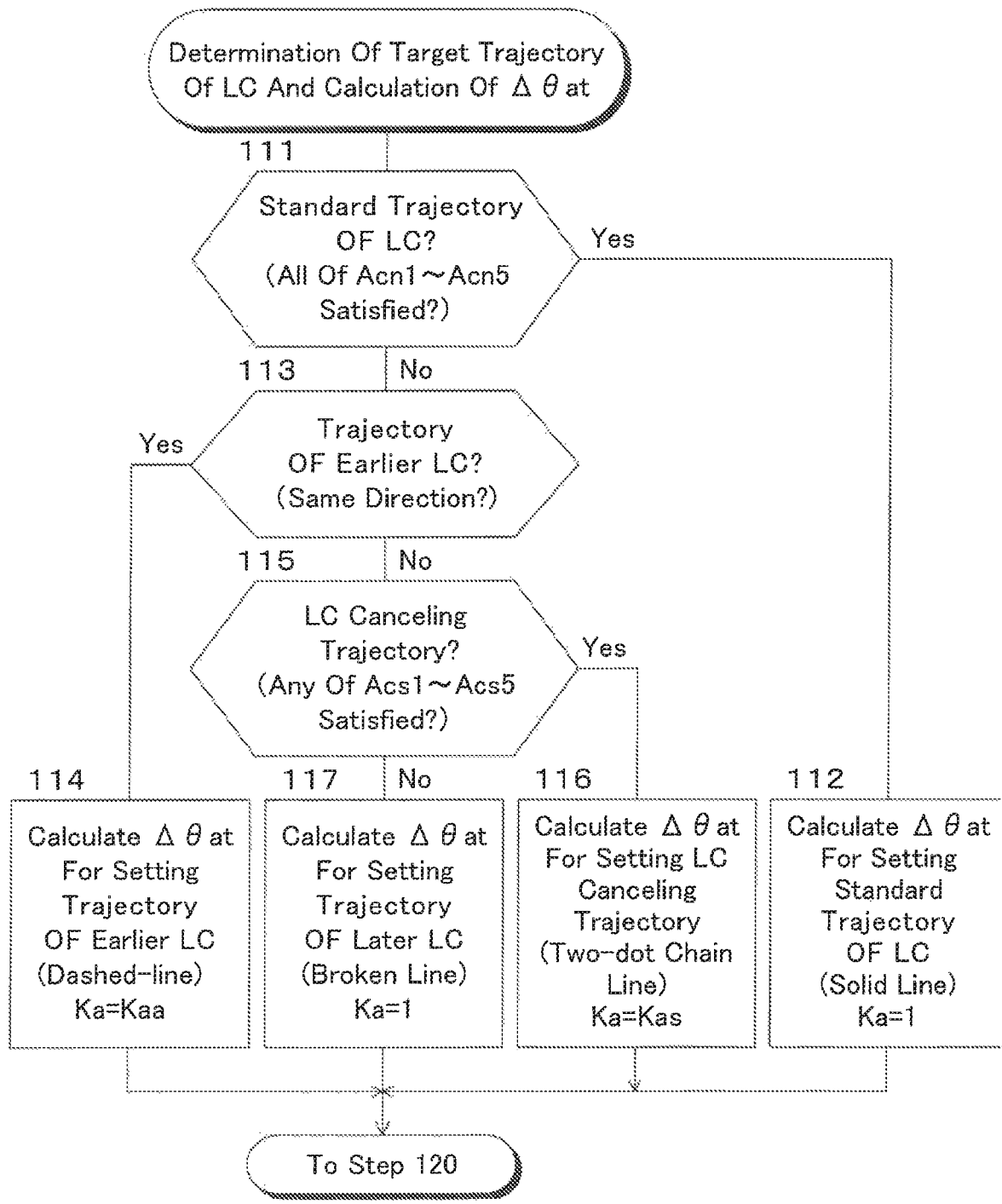
FIG. 14 is a flowchart showing routines of target trajectory determination of the lane change and calculation of a target change amount $\Delta\theta at$ of a steering angle $\theta$ executed in step 110 in the flowchart shown in FIG. 13.

Further, as is apparent from a comparison of FIGS. 14 and 4, in steps 112 and 117 in FIG. 14, as in the embodiment, the target trajectory of the lane change is set and the target change amount $\Delta\theta at$ of the steering angle $\theta$ is calculated, and the correction coefficient Ka is set to 1. In contrast, in step 114, the target trajectory of the lane change is set to the earlier lane change trajectory, the target change amount $\Delta\theta at$ of the steering angle $\theta$ is calculated, and the correction coefficient Ka is set to Kaa (a positive constant larger than 1). Similarly, in step 116, the target trajectory of the lane change is set to the lane change canceling trajectory, the target change amount $\Delta\theta at$ of the steering angle $\theta$ is calculated, and the correction coefficient Ka is set to Kas (a positive constant larger than 1). Kas is preferably larger than Kaa, but it may be the same as Kaa, or smaller than Kaa.

Figure 15:
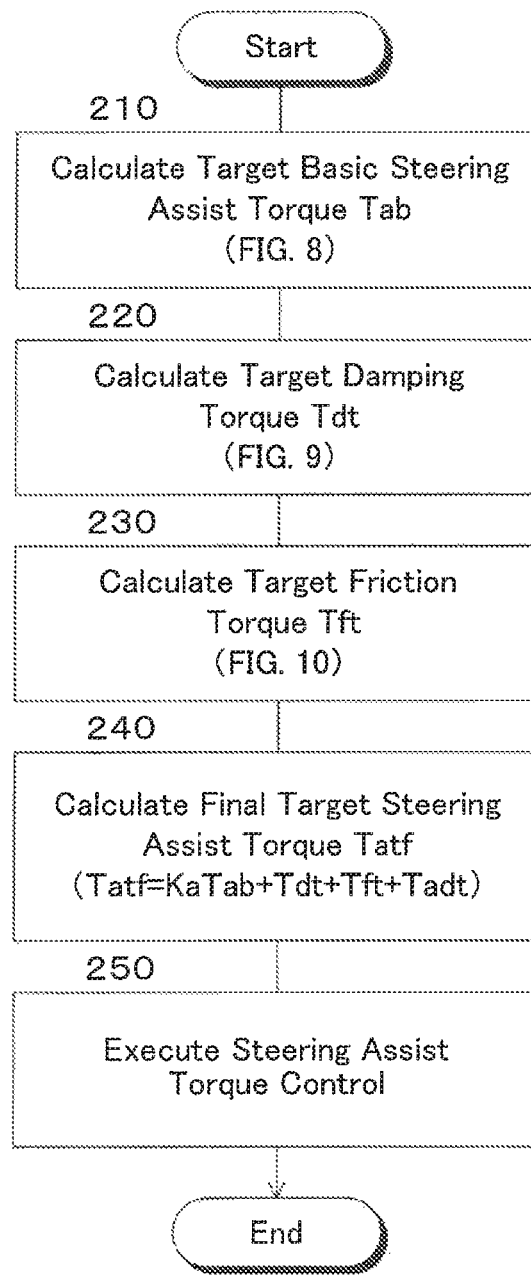
FIG. 15 is a flowchart showing a steering assist torque control routine in the modified embodiment.

Further, as seen from the comparison between FIGS. 15 and 5, in step 240 in FIG. 15, the final target steering assist torque Tatf is calculated as the sum (KaTab+Tdt+Tf+Tadt) of the product of the correction coefficient Ka and the target basic steering assist torque Tab, the target damping torque Tdt, the target friction torque Tft and the target steering torque Tadt of the LKA control). That is, the target basic steering assist torque Tab is corrected to Ka times.

As can be seen from the above description, according to the modified embodiment, in addition to being able to obtain the same effects as obtained in the embodiment, the advantage by the correction coefficient Ka can be obtained.

That is, in step 114, when the target trajectory of the lane change is changed to the earlier lane change trajectory, the correction coefficient Ka is set to Kas which is a positive constant larger than 1. In step 116, when the target trajectory of the lane change is set to the lane change canceling trajectory, the correction coefficient Ka is set to Kas which is a positive constant larger than 1. Accordingly, when the target trajectory of the lane change is changed to the earlier lane change trajectory or the lane change canceling trajectory, the target basic steering assist torque Tab is increased as compared to where the target trajectory of the lane change is not changed to one of these trajectories. Therefore, when the target trajectory of the lane change is changed to the earlier lane change trajectory or the lane change canceling trajectory, the target steering assist torque is increased so that the driver can easily perform the steering operation and it is possible to easily change the target trajectory of the lane change to the earlier lane change trajectory or the lane change canceling trajectory.

Incidentally, even when the target trajectory of the lane change is changed to the earlier lane change trajectory, as the lane change progresses, the steering operation amount of the driver decreases. Thus, a negative determination is made in step 70 and the correction coefficient Ka is set to 1. Therefore, it is possible to prevent the steering assist torque from becoming excessive during the lane change.

Similarly, even when the target trajectory of the lane change is changed to the lane change canceling trajectory, a steering operation amount of the driver decreases when the lane change cancellation is near completion. Thus, a negative determination is made in step 70 and the correction coefficient Ka is set to 1. Therefore, it is possible to prevent the steering assist torque from becoming excessive in a situation where the lane change cancellation is near completion.

Although the present disclosure has been described in detail with reference to the specific embodiment, it will be apparent to those skilled in the art that the present disclosure is not limited to the above-described embodiment, and various other embodiments are possible within the scope of the present disclosure.

For example, although in the embodiment and modified embodiment described above, the index values are a steering torque T, a steering angle $\theta$, a steering angular velocity $\theta d$, a deviation $\Delta\theta t$ of the steering angle and a lateral deviation Y, the index value may be at least one of these values, and any of these index values may be omitted.

In the embodiment and modified embodiment described above, In steps 50, 90 and 115, an affirmative determination is made when at least one of the five conditions is satisfied. However, it may be modified so that an affirmative determination is made when a plurality of arbitrary conditions out of the five conditions are satisfied.

In the embodiment and modified embodiment described above, in step 110, the target trajectory of the lane change is changed to the trajectory of the lane change earlier than the standard trajectory, the trajectory of the lane change later than the standard trajectory and the trajectory of the lane change cancellation according to the magnitudes of the index values. The trajectory of earlier lane change and the later lane change trajectory are variably set according to a vehicle speed V but are not variably set depending on the magnitudes of the index values. However, the earlier lane change trajectory and the later lane change trajectory may be modified to be variably set according to both a vehicle speed V and the magnitudes of the index values.

In the embodiment and modified embodiment described above, the standard trajectory, the earlier lane change trajectory and the later lane change trajectory have the same form, and start timing of the lane change is different. However, the shapes of the trajectories may be modified to be different from each other so that for example, a change speed of the steering angle on the trajectory of the earlier lane change becomes faster than a change speed of the steering angle in the standard lane change trajectory, and a change speed of the steering angle in the later lane change trajectory becomes slower than a change speed of the steering angle in the standard lane change trajectory.

Further, in the embodiment and modified embodiment described above, when a negative determination is made in step 50, a target change amount Δθat of the steering angle θ is set to the target change amount Δθlkat in step 60 as in the case where a negative determination is made in step 40. However, when a negative determination is made in step 50, a target change amount Δθat of the steering angle θ may be calculated to a value obtained by correcting the target change amount Δθlkat in consideration of the steering operation amount of the driver.

What is claimed is:

1. An autonomous vehicle comprising:
   a steering device configured to steer steered wheels; and
   a control unit configured to perform autonomous driving
      (i) by calculating a target steering angle for making the autonomous vehicle travel along a target trajectory and
      (ii) by changing a steered angle of the steered wheels by controlling the steering device so that a steering angle conforms to the target steering angle, wherein:
   the control unit is configured to perform lane change by setting a target trajectory of the lane change to a preset standard trajectory when it is necessary to change a lane by the autonomous driving, and
   the control unit is configured, in a situation where a lane change by the autonomous driving is necessary and steering operation is performed by a driver,
      to obtain an index value that changes in accordance with a steering operation of the driver and represents an intent by the driver regarding a trajectory of the lane change, and
      to change, without terminating the autonomous driving, the target trajectory of the lane change in accordance with a magnitude of the index value when the magnitude of the index value is larger than a standard reference value and is smaller than a first autonomous driving termination reference value.

2. The autonomous vehicle according to claim 1, wherein the index value is at least one of a steering torque, a steering angle, a steering angular velocity, a difference between a steering angle and the target steering angle and a lateral deviation of the vehicle with respect to the target trajectory.

3. The autonomous vehicle according to claim 1, wherein the control unit is configured to change the target trajectory of the lane change to any one of a trajectory of the lane change earlier than the standard trajectory, a trajectory of the lane change later than the standard trajectory and a lane change canceling trajectory.

4. The autonomous vehicle according to claim 3, wherein the control unit is configured to change the target trajectory of the lane change to the trajectory of the lane change earlier than the standard trajectory when a steering direction of the steered wheels caused by steering operation by the driver is the same as a steering direction of the steered wheels caused by the autonomous driving in a situation where the magnitude of the index value is larger than the standard reference value and is smaller than the first autonomous driving termination reference value.

5. The autonomous vehicle according to claim 4, wherein:
   the control unit is configured (i) to calculate a target steering assist torque for assisting a steering operation by the driver and (ii) to calculate a target steering torque of the autonomous driving for changing a steered angle of the steered wheels by controlling the steering device so that the steered angle conforms to the target steered angle;
   the steering device is configured to steer the steered wheels based on a sum of the target steering assist torque and the target steering torque of the autonomous driving; and
   the control unit is configured, when changing the target trajectory of the lane change to one of the trajectory of the lane change earlier than the standard trajectory and the lane change canceling trajectory, to increase the target steering assist torque as compared to where the target trajectory of the lane change is not changed to the one of the trajectories.

6. The autonomous vehicle according to claim 3, wherein the control unit is configured to change the target trajectory of the lane change to the trajectory of the lane change later than the standard trajectory when the magnitude of the index value is equal to or smaller than a lane change cancellation reference value that is larger than the standard reference value and is smaller than the first autonomous driving termination reference value in a situation where a steering direction of the steered wheels caused by steering operation by the driver is opposite to a steering direction of the steered wheels caused by the autonomous driving.

7. The autonomous vehicle according to claim 3, wherein the control unit is configured to change the target trajectory of the lane change to the lane change canceling trajectory when the magnitude of the index value is larger than a lane change cancellation reference value that is larger than the standard reference value and is smaller than the first autonomous driving termination reference value in a situation where a steering direction of the steered wheels caused by steering operation by the driver is opposite to a steering direction of the steered wheels caused by the autonomous driving.

8. The autonomous vehicle according to claim 1, wherein the control unit is configured, when the magnitude of the index value is equal to or larger than the first autonomous driving termination reference value, to terminate the autonomous driving, and
   the first autonomous driving termination reference value is larger than a second autonomous driving termination reference value that is set for a situation where a lane change by the autonomous driving is unnecessary and a steering operation is being performed by the driver.

9. The autonomous vehicle according to claim 1, wherein the control unit is configured to set the target trajectory of the lane change to the standard trajectory when the magnitude of the index value is equal to or smaller than the standard reference value.

\* \* \* \* \*